United States Patent [19]

Dubriske

[11] Patent Number: 5,595,013
[45] Date of Patent: *Jan. 21, 1997

[54] WATERPOWERED FISH DECOY AND JIGGING DEVICE

[75] Inventor: Paul C. Dubriske, Keene, N.H.

[73] Assignee: Strikeline, Inc., Keene, N.H.

[ * ] Notice: The term of this patent shall not extend beyond the expiration date of Pat. No. 5,428,916.

[21] Appl. No.: 318,278

[22] Filed: Oct. 5, 1994

Related U.S. Application Data

[63] Continuation of Ser. No. 123,753, Sep. 17, 1993, Pat. No. 5,428,916.

[51] Int. Cl.⁶ .................................................. A01K 91/00
[52] U.S. Cl. .................................................. 43/19.2; 43/26.2
[58] Field of Search .................................... 43/26.2, 27.4, 43/43.11, 26.1, 43.13, 19.2

[56] References Cited

U.S. PATENT DOCUMENTS

| | | | |
|---|---|---|---|
| 2,708,804 | 5/1955 | Kucklick | 43/26.1 |
| 3,007,276 | 11/1961 | Lidert | 43/26.2 |
| 3,457,667 | 7/1969 | Tripp | 43/26.2 |
| 4,509,287 | 4/1985 | Hood | 43/26.1 |
| 4,798,021 | 1/1989 | Miklos | 43/43.13 |
| 4,903,428 | 2/1990 | Sluiter | 43/26.1 |
| 5,035,075 | 7/1991 | Pearce | 43/26.2 |
| 5,428,916 | 7/1995 | Dubriske | 43/26.2 |

*Primary Examiner*—Joseph J. Hail, III
*Assistant Examiner*—James Miner
*Attorney, Agent, or Firm*—Wheat, Camoriano, Smith & Beres, PLC

[57] ABSTRACT

An improved underwater fish attracting device including a housing of fish shaped design retractably attached to a first cable to a boat. A parachute is retractably attached through a third cable to the fish-like housing and a second cable retractably attaches the parachute to a fishing rod on the boat. A fishing lure is also attached to the parachute. The fish-like housing is provided with a propeller on a forward outside end thereof which is in activating relationship with a movable spool within the housing for releasing and retracting the third cable to which the parachute is attached. The parachute is openable in response to the pressure of water on the underside of the parachute.

13 Claims, 7 Drawing Sheets

WATERPOWERED FISH DECOY AND JIGGING DEVICE

CROSS REFERENCE TO RELATION APPLICATIONS

This is a continuation application of U.S. patent Ser. No. 08/123,753 filed Sep. 17, 1993, now U.S. Pat. No. 5,428,916.

FIELD OF INVENTION

The present invention is related to trolling while sportfishing and more particularly to a device that is an integral part of creating a fish feeding scene by acting as decoy and imparting a life-like "stunned" fish effect to imitation lures.

BACKGROUND OF INVENTION

Sportfishermen involved in the never ending quest to more closely imitate the natural food of gamefish by imparting a lifelike jigging action to lures have previously attempted to develop underwater jigging devices.

Specifically, previously patented devices include U.S. Pat. No. 4,204,356 and U.S. Pat. No. 4,903,428. These devices moved lures forward and backward at a speed relatively slower or faster than the boat speed, or the speed of a non "jigging" lure. U.S. Pat. No. 4,509,287 and U.S. Pat. No. 4,798,021 also changed the speed and also the action of lures. As stated in U.S. Pat. No. 4,509,287, "it is not actually known why fish strike lures as they go through their various actions...". These previously developed patented inventions do not apply the recently discovered instincts of fish that cause fish to strike imitation lures.

Being able to imitate feeding fish and their prey and therefore, trigger the instinct of fish to feed is to the angler's advantage.

The need exists for a device to accomplish the duplication of the feeding scene. Although previous attempts to instill lifelike action into the feeding scene were headed in a right direction the task remained unaccomplished until the advent of the present invention.

Researchers and biologists have discovered that predatory fish stun their prey prior to feeding. Upon witnessing the fluttering and slowed motion of the prey they begin feeding. Instinct tells them that it's the real thing. When one fish feeds, being creatures of schooling habits, they all begin feeding. The stunning of the prey satisfies the fish's instinct to expand the least effort for the most nutritional gain.

Gamefish have a lateral line running along each side of their bodies. The present invention has lines that imitate this lateral line. Through this line they are able to produce a sonar like shock wave that will stun baitfish. The lateral line is now often called the strike line or the attack muscle. The present invention embodies these "fishlike" appearances better than anything presently existing.

SUMMARY OF INVENTION

The present invention comprises an underwater water powered device acting as a fish decoy and imparting a lifelike "stunned effect" to a jigging fishing lure. The device is most frequently towed while trolling but may be used in a current as well. The forward motion through the water or the motion of water passing by activates a propeller thus activating a transmission. The transmission, through a serious of spools and gears and shafts, retrieves and releases a cable over various lengths to the angler's satisfaction.

The present invention has numerous enhancing features. It eliminates undependable parts that exists in previous art, is economical to manufacture and consistently performs to expectations.

An example of an undependable part exists in U.S. Pat. No. 4,798,021 where a compression spring part #70 is not used in the capacity it was originally intended for. This may result in premature failure.

A significant improvement this invention has over other "jigging devices" is the parachute type drag. The fishing line may be attached to the jigging cable by any means of release such as a breakable rubber band or one of many fishing releases commercially available. The parachute applies a resistive draft to a rapid deployment of the jigging cable, thus stopping the lure dead in the water while the device continues to move forward.

Previous art relies on "the force exerted on the line, release and lure" to pull the cable from a reel. Some lures, such as artificial flies, have very little drag and will not "dump" the cable out.

Another improvement in the present invention lies in the housing. Simulating a feeding fish with a distinct head, eyes and tail it appears fishlike. An enhanced lateral line collects and reflects light like a feeding fish. Moreover, a propeller is mounted completely outside the housing thus allowing the propeller to be changed with a larger or smaller propeller for improved efficiency for different operating conditions.

Specific enhancements and simplifications the present invention has over prior art in the actual operations of the mechanism are significant. The present invention has the fish line attached directly to the jigging cable release, thus avoiding the cumbersome practice of attaching the fishing line to two releases. U.S. Pat. No. 4,903,428 and U.S. Pat. No. 4,204,356 rely on a two release system and the chance for a tangle is more likely. Because of the present invention direct attachment to a release and the resistive drag exerted by the force of water on the parachute, the fish pole bends and relaxes with each jig. This actual jigging action at the pole improves the angler's concentration and hence success. This action also lets the angler know that his lure is not tangled or that the device is not jammed.

The present invention propeller is attached to a shaft which has a double gear attached to the opposite end. This double gear meshes with a bevel spool gear and the bevel spur gear. The bevel spool gear is attached a spool around which is wrapped the jigging cable. As the spool turns, the cable is retrieved. A retainer is wrapped around the spool preventing the cable from "jumping" off like it will on the prior art. U.S. Pat. No. 4,798,021 and U.S. Pat. No. 4,509,287 both have open spools or reels and the chance for the line slipping off is much greater. The spool of the present invention turns freely on an axle installed perpendicular to the propeller shaft and vertically in the housing.

Also, the bevel gear spins freely on the vertical axle and in an opposite direction from the bevel spool gear. This bevel spur turns a spur gear that is mounted to a worm shaft. The worm shaft when turning forces a pawl, in a pawl retainer, to travel in a continuous helix groove along its axis. The worm shaft and the vertical axle are parallel in the housing. The pawl retainer comes into contact with the spool forcing it to travel up the axle thus disengaging the bevel spool gear from the bevel gear on the propeller shaft. As the spool is disengaged the force exerted on the jigging cable by the resistive force of the water on the parachute causes the jigging cable to unwind.

When the pawl retainer travels the length of the continuous helix groove on the worm shaft it reverses travel thus allowing the spool, which is in contact with it, to return to the propeller bevel gear. A compression spring, installed over the axle and in contact with the spool and the top of the housing, forces the spool back to the propeller bevel gear and holds it engaged there while the jigging cable is again rewound. This winding and unwinding of the jigging cable on the spool is in direct line with the force of the propeller and the parachute and thus more efficient than prior art. U.S. Pat. No. 4,798,021 requires the cable to wind at right angles to the reel which may cause a bind and will force the cable to pile on one side of the spool. U.S. Pat. No. 4,509,287 has a spool with no means for leveling the cable as it winds on the spool and this could cause a bind.

To best understand these enhancements and the advantages thereof, reference to the detailed drawings, the descriptions thereof, and the preferred embodiment of the present invention hereinafter appear.

BRIEF DESCRIPTIONS OF THE DRAWINGS

FIGS. 7A–7F are a detailed view of the spool, retainer strap and bevel gear.

DETAILED DESCRIPTION OF PREFERRED EMBODIMENT

Figure 1:
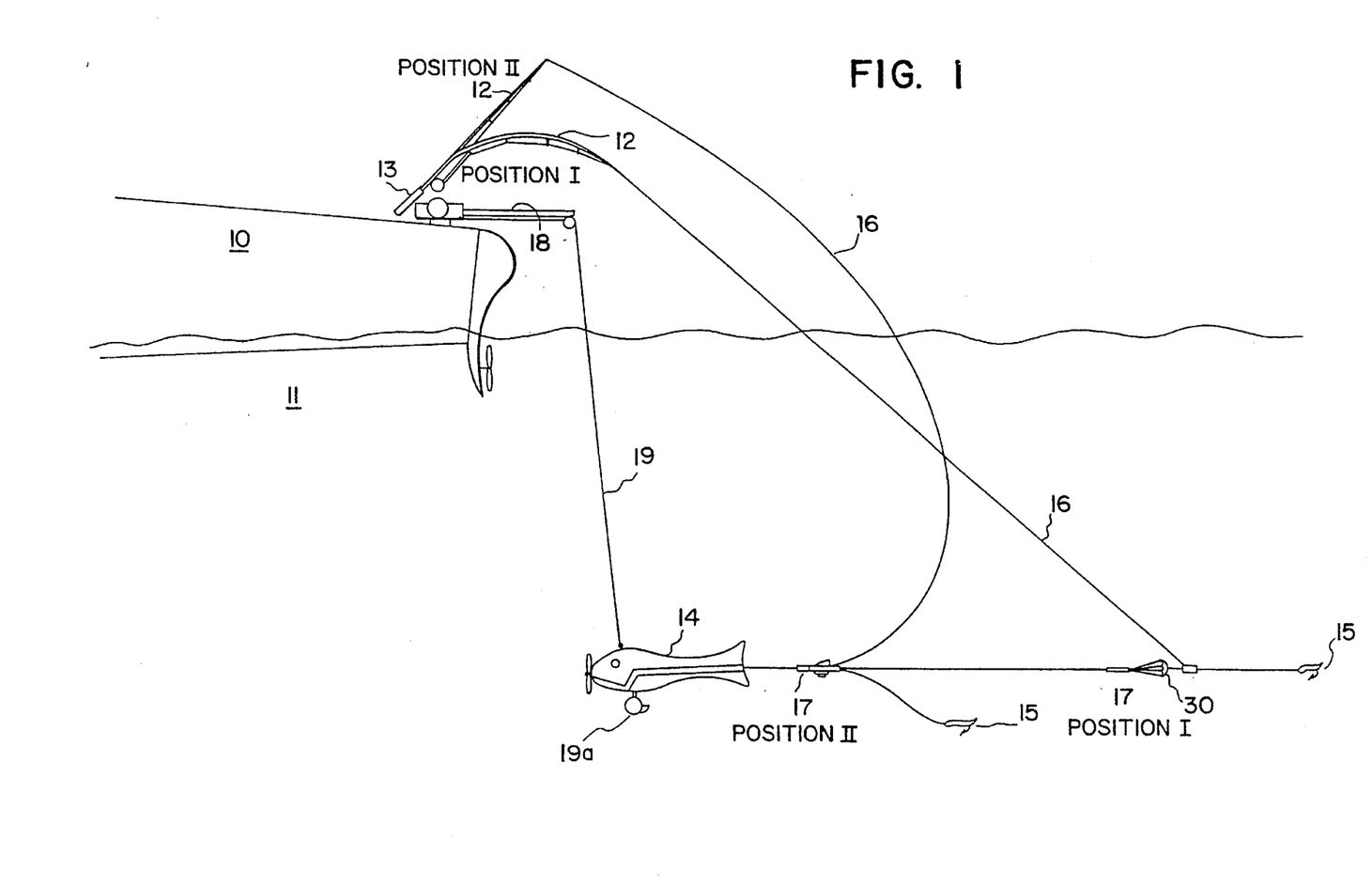
FIG. 1 is a diagram of a side view of the present invention being used as towed by a boat with a downrigger with a fishing rod and line connected to the invention in typical fashion.

Referring to FIG. 1 there is a boat 10 on a body of water 11 with a fish pole 12 mounted in a rod holder 13 with a fishline 16 extending underwater to a new device 14 capable of imitating a fish and capable of imparting an apparent stunned and erratic motion to a lure 15 on the fishing line 16 which is attached to a parachute 17 type drag. The device 14 is suspended from a downrigger 18 and a downrigger cable 19 with a lead weight 19a attached to the bottom of the device 14.

FIG. 1 shows the device is working in two different positions. Position I is with the cable 27 fully extended and the lure 15 trolling as it normally would in a typical downrigger type fishing arrangement. As the device 14 retracts the cable 27 towards position II the line 16 and hence the lure 15 accelerates thus representing a darting baitfish. Also the fishing rod 12 is relaxed as tension on the fishing line 16 decreases because it is being pulled closer to the boat 10. As the cable 27 exerts additional force on the parachute drag 17 the mechanism within the drag 17 allows the parachute 30 to collapse thus creating less drag and making it easier to retract cable 27, fishing line 16 and lure 15. In position II the cable 27 is fully retracted and about to be released. Upon releasing, the force on the cable 27 made during retraction, is relaxed and the parachute 30 once again becomes fully open catching the maximum amount of water. The drag 17 is held motionless as the device 14 moves forward until the cable 27 is completely extended. While the parachute 17 is motionless the attached lure 15 is motionless and either sinking, suspended neutral or floating up depending on the type of lure.

A fish witnessing such a scene perceives the device as another fish cruising the area and feeding. The lateral line is used by fish to stun their prey. The lure that is floating or fluttering down appears to have been stunned. When a fish stuns its prey in such a manner it does so by passing its lateral line very close to the prey as it swims by it. It swims by and turns to see if the prey is fluttering, and thus the real thing, and strikes; or it may strike another similar prey in the close proximity. The witnessing fish, which is the angler's prey, hopefully will strike this fluttering lure.

Targeted species desirable to anglers such as salmon, trout, and walleye in freshwater and tuna, sailfish and marlin in saltwater, are known to follow bait or lures for some distances prior to striking. A fish following a lure attached to this device will not follow after the first "jig" or release of the cable because it would bump into the lure. This intimidates a fish and will make it strike from natural aggression.

The device is capable of being adjusted as to the frequency of the "jig" and the length of the "jig" with interchangeable parts. In different fishing speeds, such as real slow for walleye or real fast for tuna, this is valuable to the angler and makes the device more versatile and marketable.

Figure 2:
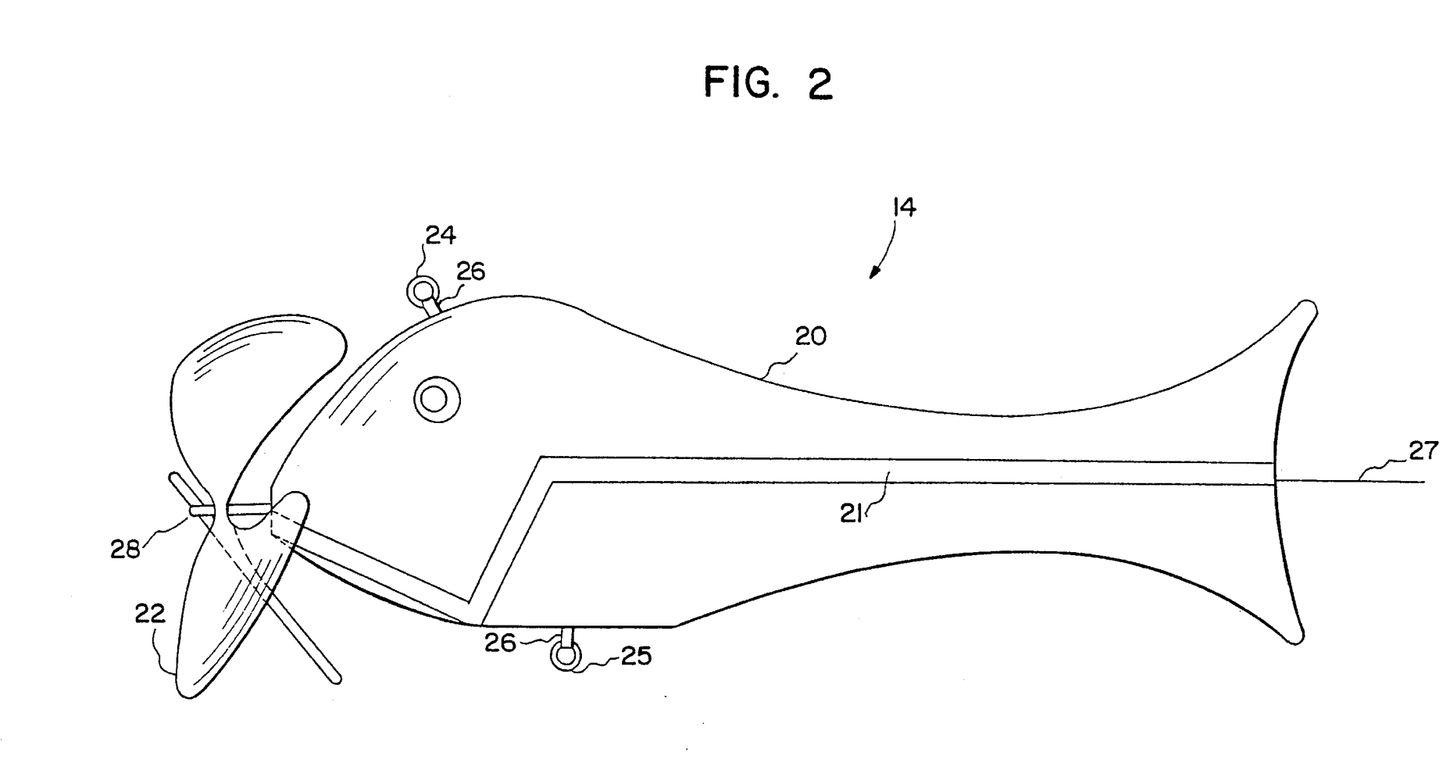
FIG. 2 is a side view of the invention.

In FIG. 2 a side view of the device, shows the design intended to decoy fish into feeding. The device 14 has a prominent reflective line 21 imitating the lateral line of gamefish an eye 23 and the basic fish shape. Propeller 22 attached to shaft 40 and secured by cap nut 28, the propeller is made from a clear polycarbonate material so that it is virtually invisible underwater. Stainless steel studs 24 and ring 26 are attached to the top of the device to use in securing a downrigger cable and stainless steel stud 25 and ring 26 are used to attach a lead weight of the conventional type used in typical downrigger fishing.

Figure 3A:
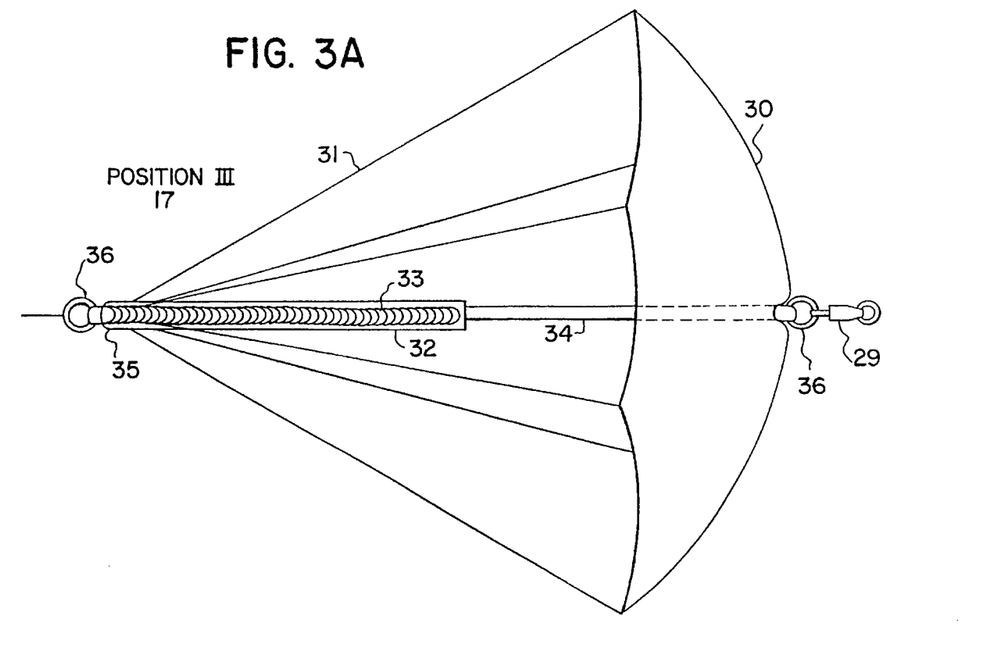
FIGS. 3A and 3B are a two position view of the parachute drag of the invention. Position I (FIG. 3A) is with the parachute fully deployed and position II (FIG. 3B) is with the parachute fully collapsed.
Figure 3B:
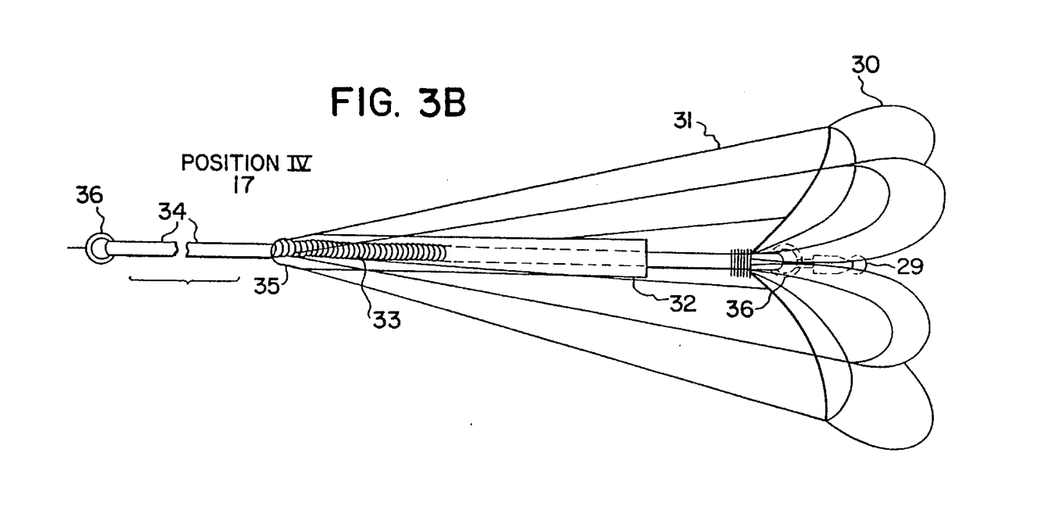

FIGS. 3A and 3B show the two functional positions of the parachute type drag 17 attached to the jigging cable 27 and a swivel 29 to which the angler attaches his release and fishline. In the first position the parachute is fully opened and captures the most water thereby causing the most resistance as it moves through the water. The focal point of the resistance is at the restricted end 35 of tube 32 where it is in contact with compression spring 33. Compression spring 33 is attached to rod 34 at its midpoint. The parachute 30 is also connected to rod 34 at the end where swivel 29 is attached by ring 36. When enough force is created by the water on the parachute 30 to force tube 32 to compress spring 33, tube 32 travels rearward along rod 34 allowing strings 31 to let the leading edge of parachute 30 to drop back relative to its attached point on rod 34. The result is a collapse of the parachute 30.

In position IV of FIG. 3 a collapsed parachute 30 is demonstrated. Tube 32 has fully compressed spring 33 with its restricted end 35, strings 31 have allowed the leading edge of parachute 30 to drop back relative to the attached point on rod 34 thus significantly reducing the force applied to this limited area. The significance of this variable force drag in application is that it allows the angler to effectively use the device in a number of different fishing situations. For example, an ocean fisherman trolling for gamefish such as sailfish, troll at relative fast speed, say 6 knots. At this speed the parachute drag will be collapsed at all times as the force on the compression spring will be of considerable energy and the force on the cable caused by the fishline and large ocean lure is enough to quickly release the cable. An angler trolling in the great lakes for salmon and trout troll at an average speed of 2–3 knots. At this speed the parachute drag will be fully open while the cable is releasing and fully collapsed while the cable is being retracted. An angler fishing very slow, such as drift fishing for walleye, will be moving less than 1 knot. At this speed the parachute drag will be opened at all times. This variable parachute drag is the result of over two years of testing in as many different conditions that could be found. Nearly 24 different prototypes were tested both in the field and in a controlled test tank. Metal parts are stainless steel, the parachute itself is made from from ripstop nylon and the cords are nylon. This durable and effective device is an integral part of the jigging device and will provide the user with dependable and consistent service.

Figure 4:
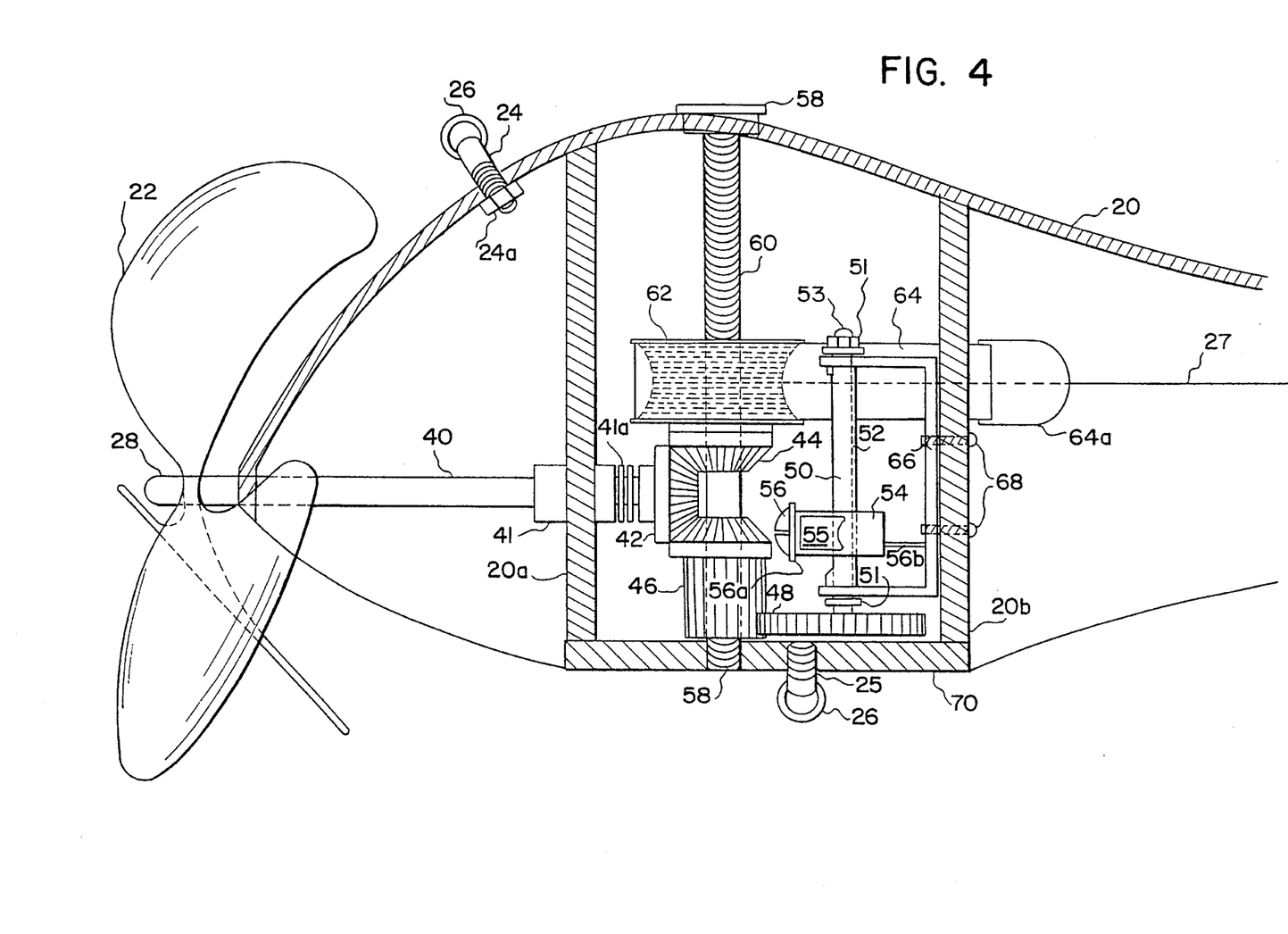
FIG. 4 is a sectional view of the main working parts of the invention in such a position to show the parts as the device retracts the cable.
Figure 5:
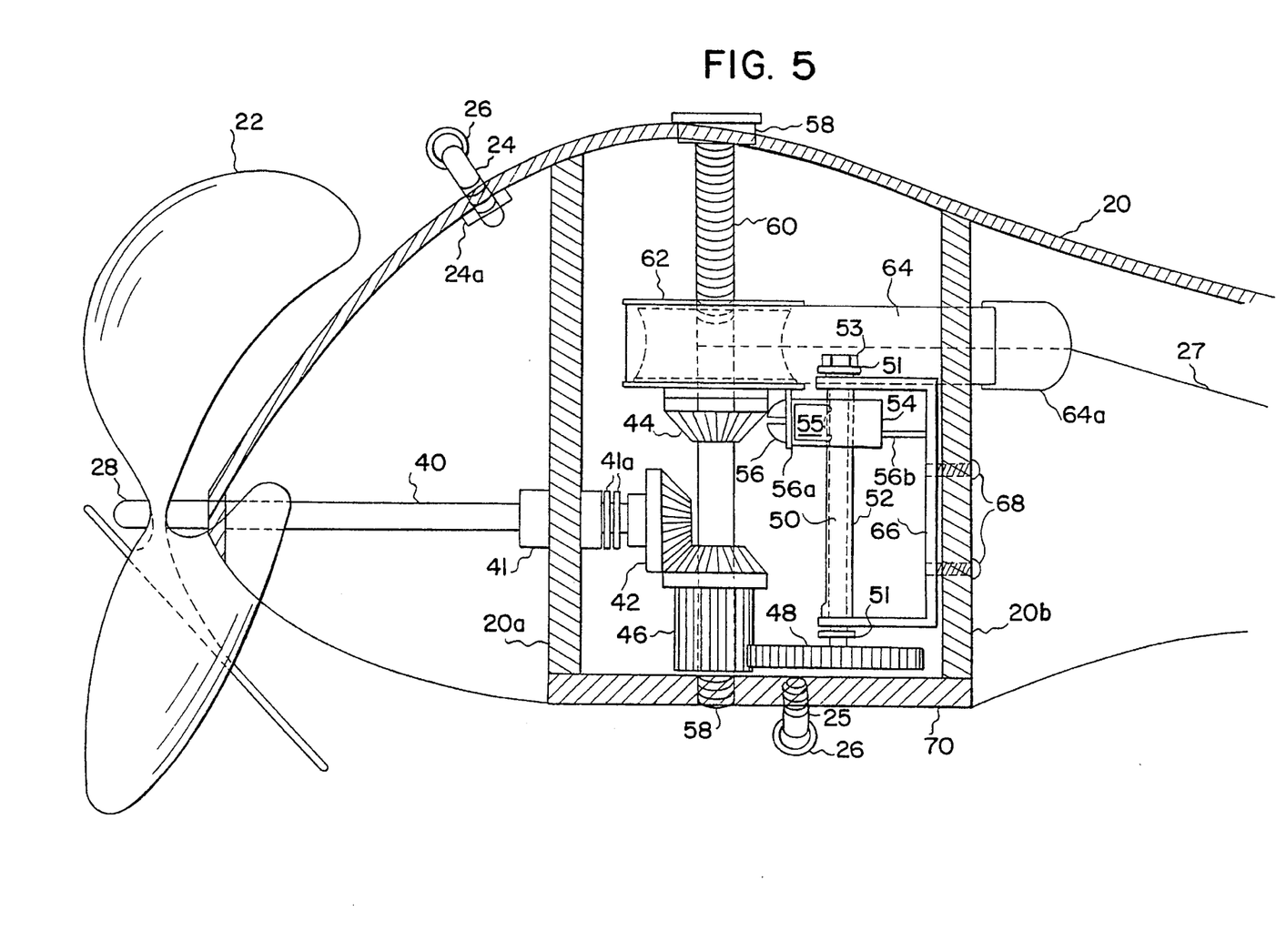
FIG. 5 is a sectional view of the main working parts of the invention in such a position to show the parts as the device releases the cable.
Figure 6A:
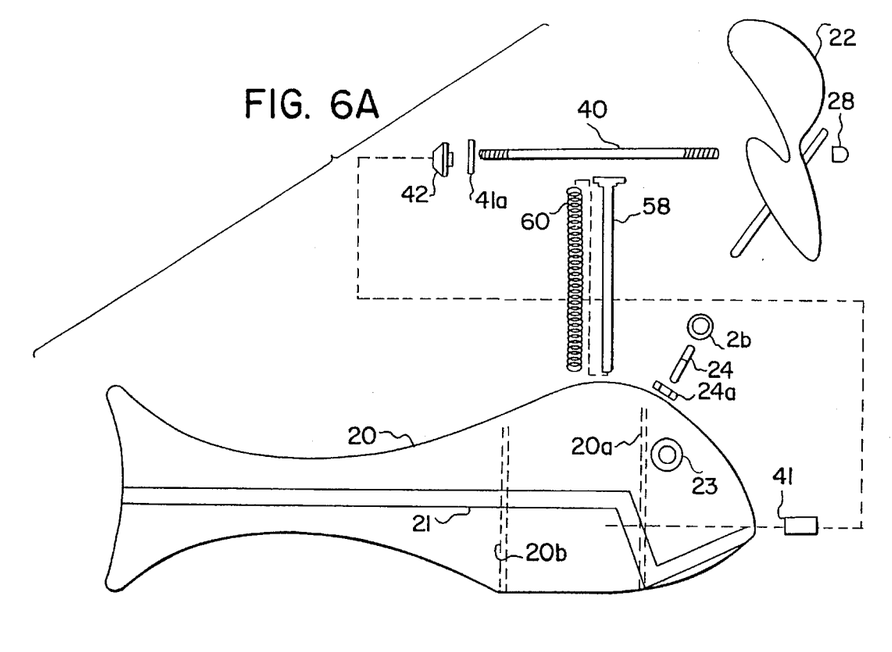
FIG. 6 is a view of the exploded parts of the invention.
Figures 6B, 6C:
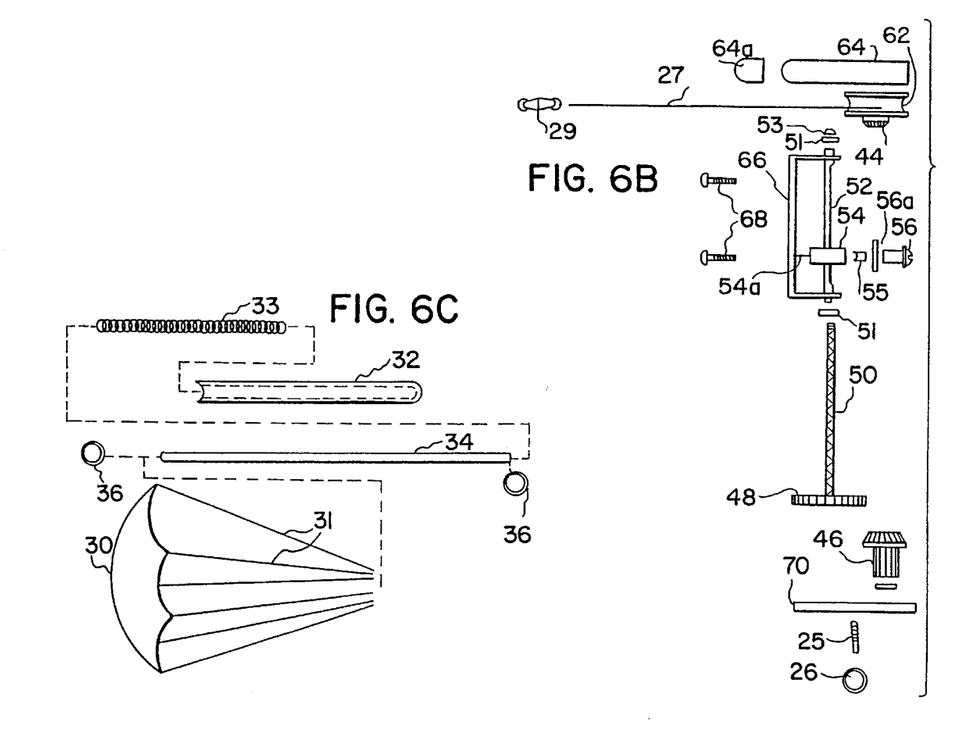
Figure 7A:
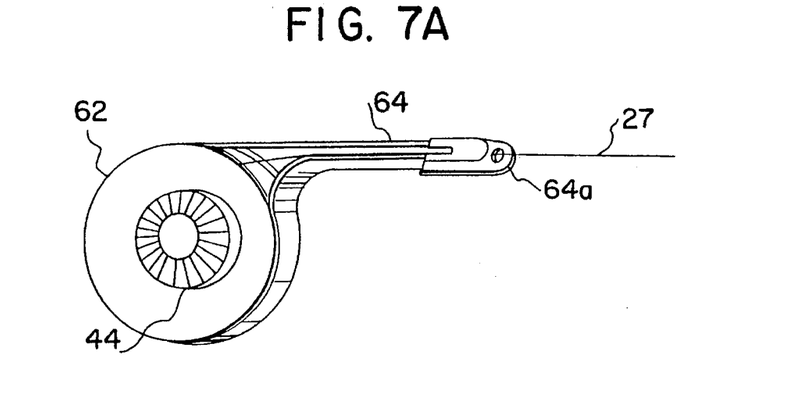
Figure 7B:
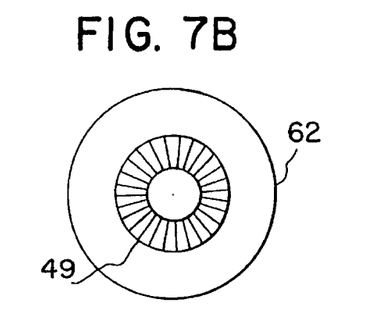
Figure 7C:
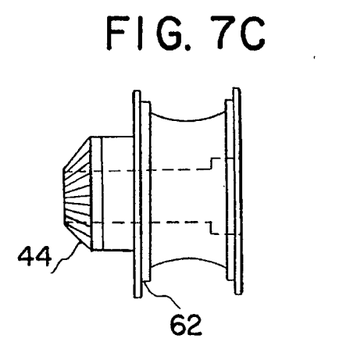
Figures 7D, 7E:
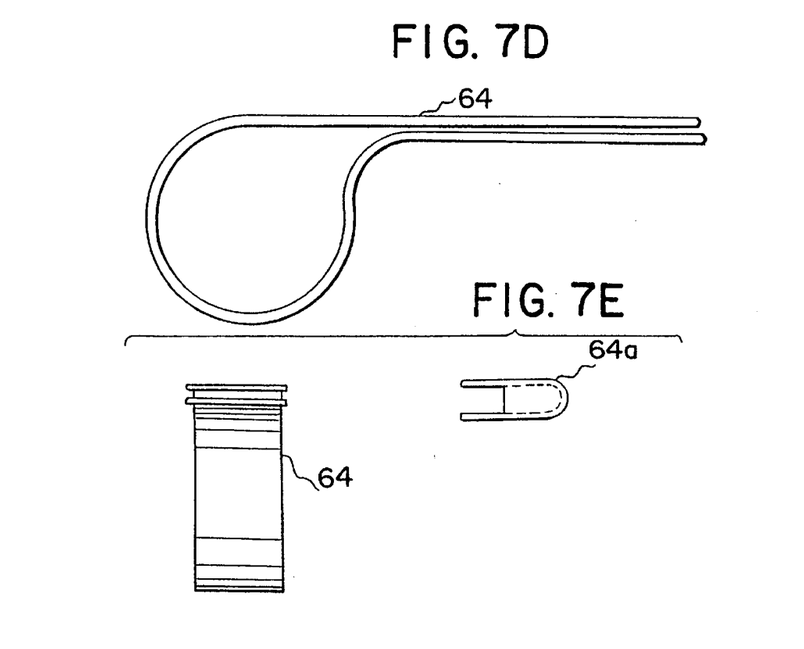

FIGS. 4 and 5 show detailed sectional views of device 14. FIG. 4 is demonstrating the housing 20 positioned as it would while cable 27 is being retrieved. Propeller 22 is driven by the force of water against it and is secured to shaft 40 by cap nut 28. As shaft 40 turns, likewise turning beveled gear 42 and being held centered by inside wall 20a, which is part of housing 20 and by bushing 41 and properly aligned by washers 41a. Bevel gear 42 meshes with the bevel gear 44 on spool 62 and with the bevel/pinion gear 46. When bevel gear 42 rotates in its normal counter clockwise direction, as seen looking at its face, it turns bevel gear 44 in a clockwise direction and bevel/pinion gear 46 in a clockwise direction. As bevel gear 44 and bevel/pinion on gear 46 are facing each other they are actually turning in opposite directions. Bevel gear 44 mounted on spool 62 and bevel/pinion gear 46 are both rotatably mounted on axle 58. Axle 58 is inserted through the top of housing 20 and threads into plate 70. Also installed over axle 58 is compression spring 60. This system of installing the axle through the top of the housing with the compression spring already on and passing through the spool and bevel/pinion gear and threading into the bottom plate, is a very efficient and easy method by which the user is able to clean and interchange parts. Also in FIG. 4, as bevel gear 44 turns it turns spool 62. The turning spool 62 has cable 27 attached to its center hub. This center hub has a radius that is concave forcing cable 27 to begin wrapping around the center and then forcing its way to the outer sides as it becomes fuller. This is important as it keeps the cable from being piled too high on one side and binding. Also on spool 62 is located strap 64. Strap 64 wraps around the outside edge of the spool and rides on a shoulder just inside the outer most circumference of the spool. This trap continues rearward in housing 20 and travels along inside wall 20b and as spool 62 moves along axle 58, the strap is moving with it. The spool rotates freely inside this strap allowing cable 27 to wind around spool 62 and during the unwinding the cable 27 can not jump off the spool.

At the end portion of the strap 64 that extends rearward, is a nylon guide 64a with a hole allowing cable 27 to pass through and directing it toward the rear of housing 20.

Bracket 66 is mounted to housing 20 on inside wall 20b by screws 68. Bracket 66 serves to hold worm shaft retainer 52 and a slot in bracket 66 receives guide 56b from the bottom of pawl retainer 54. Bevel/pinion gear 46 drives spur gear 48. Spur gear 48 is attached to worm shaft 50. Worm shaft 50 drives pawl 55 along its axis. Pawl 55 is retained in pawl retainer 54 and is further held in place by cap screw 56. Cap screw 56 holds push washer 56a in place. Also, it is this push washer that contacts spool 62. As pawl retainer 54 moves along worm shaft retainer 52 it engages spool 62 on the spools outside face at the point of push washer 56a. When spool 62 is disengaged its bevel gear 44 is disengaged from bevel gear 42 and it is now able to spin freely on shaft 58.

The drag being placed on cable 27 causes the spool to freewheel thus unwinding the cable. The pawl retainer 54 continues to the top of worm shaft retainer 52 nearly touching the top of bracket 66 and then begins descending along the worm shaft retainer until it reaches the bottom of bracket 66 and continues to follow this up and down motion as long as spur gear 48 is driving worm shaft 50.

FIG. 4 shows a position when pawl retainer is not touching spool 62, spool 62 is fully engaged with bevel gear 42 and would be retrieving cable 27 as propeller 22 drives the mechanism.

FIG. 5 shows pawl retainer 54 having pushed spool 62 away from bevel gear 42 and cable 27 would be unwinding by force from cable 27. FIG. 5 also shows compression spring 60 fully compressed and forcing spool 62 back towards bevel gear 42 as pawl retainer 54 allows spool 62 to descend along shaft 58.

FIGS. 4 and 5 also show stud 24 with ring 26 held in place by nut 24a and threaded through housing 20. Stud 25 is threaded into plate 70 with ring 26 attached. These studs and rings are for attaching the device 14 to a cable and to hang a conventional weight on.

Housing 20 and propeller 22 are preferably made from a polycarbonate material and thus light weight and durable. The propeller is usually clear so as to be less visible in the water, but may also have reflectors attached to act as an attractant. The bevel and spur gears are preferably NYLON, the axle and propeller shaft are generally stainless steel and the worm shaft, worm shaft retainer pawl and pawl retainer are the parts of a typical level wind reel used to evenly stack the line on a conventional fishing reel spool. The bracket holding this assembly is generally stainless steel as are the screws attaching it to the housing. The spool is, for example, NYLON or polycarbonate and the strap retaining the TEFLON coated DACRON cable is NYLON. This device is the result of four years of design, developing and testing of 16 different prototypes with many variations in each. The exhaustive effort in developing this product consumed thousands of hours and tens of thousands of dollars. Every part and every material used were tested to provide the least costly and most dependable fishing lure. Extensive field testing by a variety of professional and amateur anglers provide a wide range of opinions and the resulting device is the product of the best of these ideas. During development when the patent search was completed, prototypes and methods that had been eliminated as not the most efficient were discovered in the prior art. References to dimensions, pitches, tolerances and the like have been avoided in this description because they will serve to limit reader understanding as most parts can be changed to effect different performance as outlined elsewhere. Specific changes that may become common include changing spool 62 to a spool with a smaller or larger radius in its hub, allowing for more or less cable to be wound with each revolution and relocating bracket 66 and consequently the worm drive higher on inside wall 20b thus changing the amount of revolutions, spool 62 is engaged with bevel gear 42. Propeller 22 would make the device operate slower or faster with more or less pitch. The relative light weight of the unit allows the user to suspend a weight of their preference at stud 25 and thus control the angle or attitude the device moves through the water. As presented, the overall length of the device is 16", the width is 2", and the height at the axle is 5". The parachute drag is 6" long with a 5" diameter parachute.

Thus, if the attempt to make this device understandable and clear to the reader has been accomplished, its versatility and dependability, and hence the anticipated demand, will be obvious. Using the latest knowledge known as to the habits and instincts of gamefish and using the most advanced and dependable materials available, the device will provide the angler with more fish thus encouraging the conservation of them and with more satisfaction thus encouraging participation at all levels of skill and interest.

This particular preferred embodiment of the invention has been shown and described and it will be obvious to those skilled in the art that changes and modifications may be made without departing from the invention and therefore, the aim of the claim is to cover all such changes and modifications that fall within the true scope and spirit of this invention.

What is claimed is:

1. An apparatus for the attraction of and catching of fish including a jigging device connected by a line to lure, said jigging device being actuated by the motion of water relative to said jigging device and cyclically reeling said line and lure toward said jigging device and releasing said line and lure, said improvement comprising a drag increasing device spaced from said jigging device on said line, said drag increasing device being actuated when said line is released by said jigging device and increasing a dragging force on said line and said lure, said drag increasing device pulling said line and lure away from said jigging device and causing said lure to have a motion relative to said jigging device essentially the same as said motion of the water relative to said jigging device whereupon said lure resembles a stunned fish substantially motionless in the water.

2. The apparatus of claim 1 in which said jigging device is housed within a fish decoy.

3. The apparatus of claim 2 in which said drag increasing device comprises a parachute operably connected to said line and a biasing element coupled to said parachute, said biasing element biasing said parachute into an open position when said line is released by said jigging device thereby increasing the drag force on said line in a direction away from said jigging device.

4. An apparatus for imparting predetermined motions to a fishing lure comprising (a) a fish decoy adapted to be submerged in water adjacent and connected by a first line to a support structure for supporting an operator of said apparatus, whereupon the water in which said decoy is submerged has a predetermined motion with respect to the decoy;

(b) a lure variably spaced from and operably connected through a lure connecting line to said decoy;

(c) a fish line adapted to be operated by the operator and connected to said lure connecting line at a position adjacent said lure;

(d) an operating device associated with said decoy and said lure, said device actuated by relative motion of said water past said device, said operating device including a first mechanism for pulling said lure connecting line and said lure toward said decoy during a first time period at a first motion with respect to said decoy and thereafter releasing said lure connecting line and a second mechanism responsive to said first mechanism releasing said lure connecting line for increasing the drag acting on said lure connecting line during a second time period and causing said lure to have a second motion with respect to said decoy essentially the same as the predetermined motion of the water with respect to said decoy whereby said lure resembles a stunned fish substantially motionless in the water during said second time period.

5. The apparatus of claim 4 in which said first mechanism is housed within said decoy.

6. The apparatus of claim 5 including a propeller mounted on said decoy device for driving said first mechanism.

7. The apparatus of claim 4 in which said second mechanism provides a variable drag force that is greater when said first mechanism releases said lure connecting line than when the first mechanism is pulling said lure connecting line toward said decoy.

8. The apparatus of claim 7 in which said drag mechanism comprises a parachute and a biasing element coupled to said parachute, said biasing element biasing said parachute into an open position with a predetermined biasing force until said drag force exceeds said biasing force thereby allowing said parachute to begin to collapse.

9. The apparatus of claim 8 in which said second mechanism further includes a rod member connected at one end to said second line and a tubular member slidably engaged to said rod, said biasing element being a spring housed within said tubular member having one end abutting a front portion of said tubular member and another end abutting a portion of said rod, said parachute attached by strings to said tubular member, whereby when a drag force exerted on said tubular member by said parachute through said strings exceeds the compression force of said spring said tubular member moves toward said parachute and said parachute begins to collapse.

10. A fishing lure apparatus, connected to a support structure and adapted to be submerged into water, for varying the drag force of the lure apparatus during operation of the apparatus and during motion of said apparatus with respect to said support structure comprising a lure;

a first mechanism adapted for movement relative to the water and operably connected to said lure by a line; and a drag increasing device associated with said first mechanism for alternately increasing and decreasing the force of drag operating on said line and lure, said device operable to increase the magnitude of said drag force beyond a level of a drag force generated by said lure and line alone when said first mechanism releases said line, whereby said lure when said line is released resembles a stunned fish essentially stationary in the water.

11. The apparatus of claim 10 in which said drag increasing device comprises a parachute having an open position when said first mechanism releases said lure connecting line and a folded position when said first mechanism reels in said first line.

12. The apparatus of claim 11 in which said device includes a biasing element coupled to said parachute, said biasing element biasing said parachute toward said open position with a predetermined biasing force less than the force of drag generated when said first mechanism reels in said lure.

13. The apparatus of claim 12 in which said first mechanism includes a propeller driven by relative water movement and causing said first mechanism to reel in said lure.

* * * * *